July 23, 1957
R. S. DAVIES
2,800,580
DELAY SYSTEM
Filed April 21, 1952
2 Sheets-Sheet 1
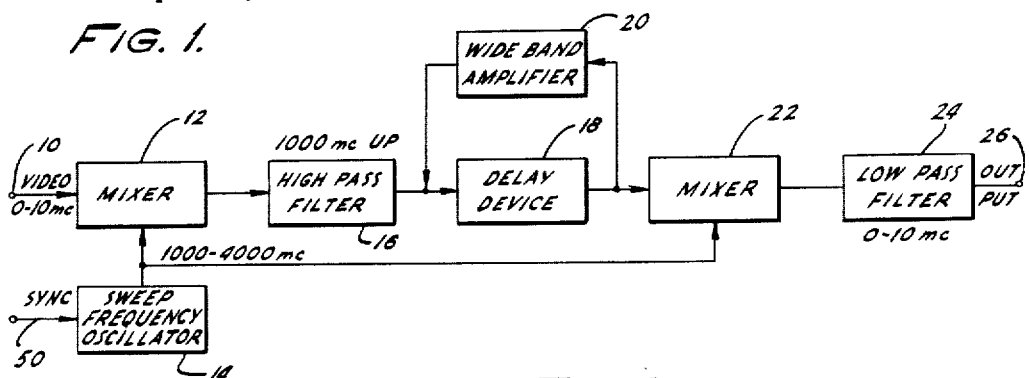
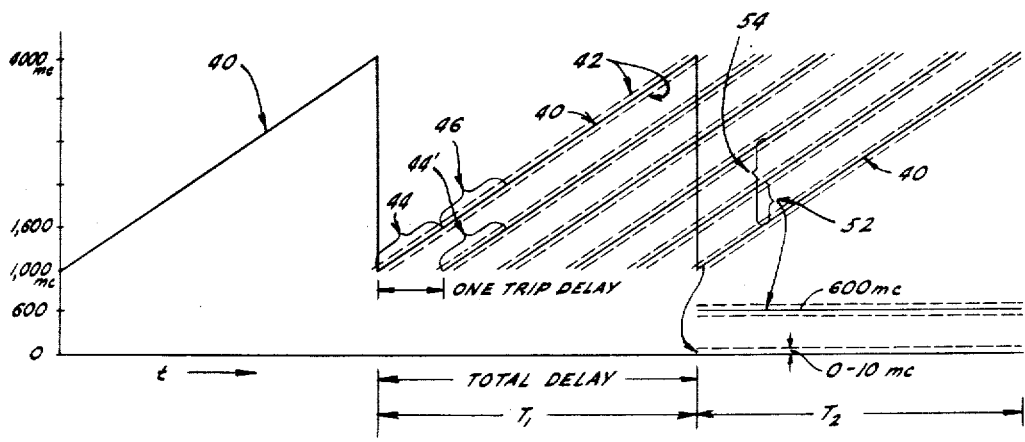
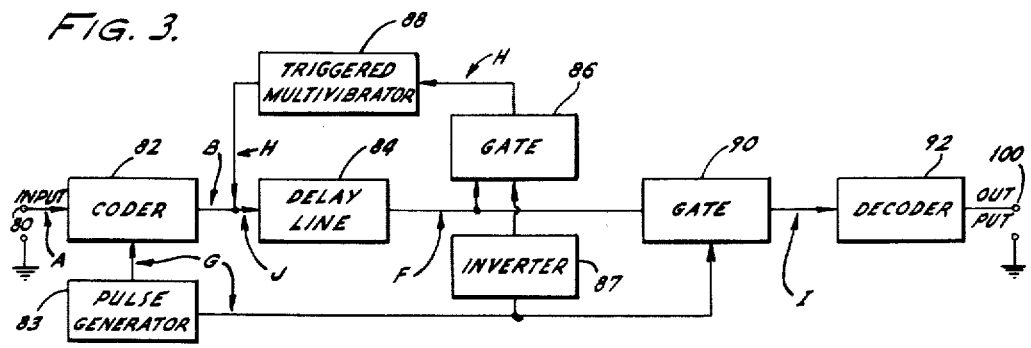
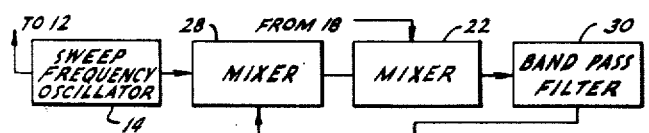
INVENTOR.
RICHARD S. DAVIES
BY
Brown, Denk & Lynnestvedt
AGENTS

United States Patent Office 2,800,580
Patented July 23, 1957

2,800,580

DELAY SYSTEM

Richard S. Davies, Philadelphia, Pa., assignor to Philco Corporation, Philadelphia, Pa., a corporation of Pennsylvania Application April 21, 1952, Serial No. 283,450

14 Claims. (Cl. 250—20)

This invention relates to signal delay systems and, more particularly, to systems for delaying a signal for an interval of time greater than the delay time of a conventional delay device.

In radar systems designed for the detection of moving targets it is frequently necessary to store an information-bearing signal for a period of time equal to 1000 to 2000 microseconds. Similar signal storage problems also arise in the television and computer arts. Liquid and solid ultrasonic delay lines have been developed for storing a signal for such an interval. However, present ultrasonic delay lines are comparatively bulky, somewhat unreliable and have undesirable irregularities in the passband. Delay lines having delay time of only a few microseconds are available which are reliable and which are not subject to irregularities in the passband. For example, a radio frequency coaxial cable having a delay time of an order of a few microseconds has a very wide passband and a relatively low loss at high frequencies. However, a coaxial cable delay line having a delay of the order of 1000 to 2000 microseconds would be extremely bulky and impractical. Systems have been devised for providing delays greater than the delay time of a delay device by recirculating the signal through the delay line. However, such prior systems generally require that the signal being delayed be modulated and demodulated after each passage through the delay line. One such system is described in the copending application of Allen C. Munster, Serial No. 716,004, for Multiple Signal Delay Device.

Therefore, it is an object of the present invention to provide a signal delay means that is relatively free of irregularities in the passband thereof.

Another object of the present invention is to provide a novel system having a delay time considerably greater than the delay time of the delay device forming a part of the system.

Another object of the invention is to provide means for continuously storing in a delay device information occurring over a period of time greater than the delay time of the delay device.

Still another object of the invention is to provide a system in which a signal is recirculated through a delay means without periodic modulation and demodulation of the signal.

It is a further object of the present invention to provide an improved system for extracting a signal from a delay device after said signal has made a predetermined number of passages through said delay device.

These and further objects of the present invention, which will become apparent as the description of the invention proceeds, are generally accomplished by applying the information-bearing signal to be delayed to the input of a delay device, coupling the output of the delay device to the input thereof, thereby to cause the information-bearing signal to be passed repeatedly through the delay device, and then deriving a signal from the delay device through a circuit that is normally inoperative to pass a signal during the delay period either for the reason that it is normally biased to an inoperative state or for the reason that the frequency of the signals applied thereto lie outside the passband of the circuit. For a better understanding of the invention, reference should be made to the following detailed description which is to be read in conjunction with the accompanying drawings, in which:

Fig. 1 is a block diagram of one preferred embodiment of the invention in which signals in the delay device are separated in frequency;

Fig. 1A illustrates a possible modification of the system of Fig. 1;

Fig. 2 is a frequency versus time plot of certain signals existing in the system of Fig 1;

Fig. 3 is a block diagram of a second preferred embodiment of the invention in which signals in the delay device are separated in time.

Figure 4:
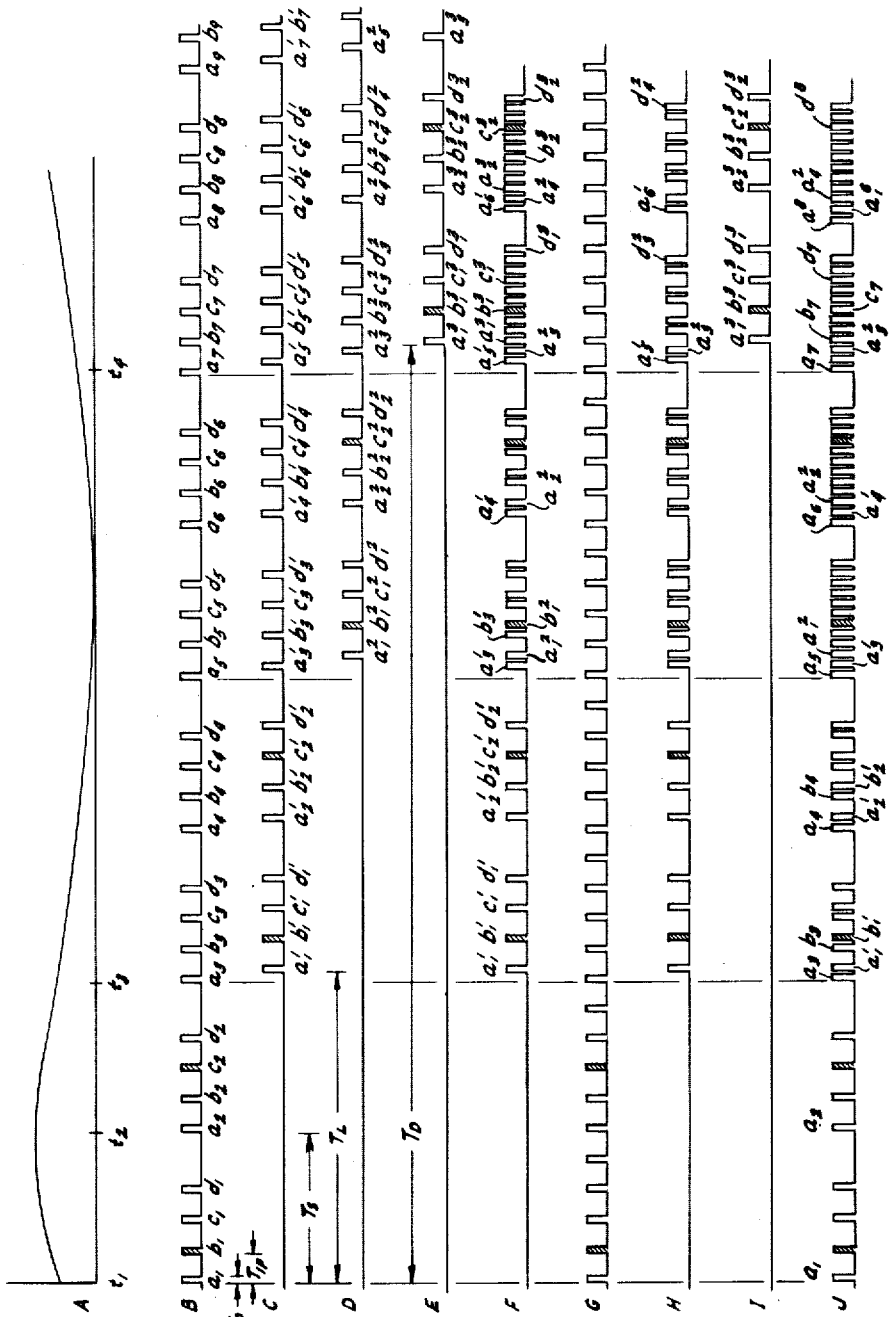
Fig. 4 is an amplitude versus time plot of signals existing at various points in the system of Fig. 3.

In the embodiment of the invention illustrated in Fig. 1, the signal to be delayed is supplied to input terminal 10 which is one input of a mixer 12. A sweep frequency oscillator 14 is also coupled to mixer 12 to supply a second signal thereto. The output of mixer 12 is coupled through a high-pass filter 16 to the input of a delay device 18. Delay device 18 may be a section of coaxial cable as mentioned above or it may be any one of a number of known artificial delay means having a relatively wide bandwidth. The output of delay device 18 is coupled back to the input thereof through a wide-band amplifier 20. Wide-band amplifier 20 should have a uniform frequency response characteristic throughout the band of frequencies swept by oscillator 14. The output of delay device 18 is supplied to one input of mixer 22. A second input of mixer 22 is derived from sweep frequency oscillator 14. The output of mixer 22 is coupled through a low-pass filter 24 to the output terminal 26 of the system.

Although the system shown in Fig. 1 will operate satisfactorily over a rather wide range of frequencies, certain specific frequencies have been assumed in the following description of Figs. 1 and 2 to better illustrate the operation of the present invention. The signal applied at terminal 10 may be a video signal containing frequency components within the band of zero to 10 mc. The amplitude of each frequency component within this band may be substantially constant as in the case of frequencies resulting from a periodically recurring pulse train, or one or more of these frequency components may vary in amplitude with time as would be the case if the video signal represented successive lines of a television signal. Sweep frequency oscillator 14 is assumed to have a frequency that varies at a substantially uniform rate from 1000 to 4000 mc. but it is to be understood that oscillator 14 may vary between other limits, the exact nature of the frequency variation being subject only to the restrictions which will be mentioned below. Oscillator 14 repeats this variation in frequency periodically as shown by the heavy line 40 in Fig. 2. In Fig. 2, the time interval $T_1$ is the interval during which a video signal is supplied to mixer 12 and the interval $T_2$ is the interval in which the delayed output signal is obtained. Thus it will be seen that interval $T_1$ is also equal to the total delay to be introduced into the information-bearing signal. It will become apparent as the description proceeds that a second video signal may also be supplied to terminal 10 during interval $T_2$ while the signal supplied during interval $T_1$ is being recovered at terminal 26 and the delayed version of this second signal recovered during the time interval following interval $T_2$ or, in general, video signals may be supplied during any interval in which the frequency of oscillator 14 undergoes a variation in frequency and a delayed version of the signal recovered at the time that oscillator 14 next repeats this variation in frequency.

The signal in the output of mixer 12 will contain frequency components equal to the sum of the instantaneous frequency of oscillator 14 and the frequencies of the components in the signal applied at terminal 10. As shown in Fig. 2, the frequencies in the output of mixer 12 will lie within the band defined by dashed lines 42. Highpass filter 16 is provided for blocking all frequencies below 1000 mc. so that the signals applied at terminal 10 are not applied directly to delay device 18.

The information-bearing signal applied at terminal 10 may continue for the entire period of the variation of the frequency of oscillator 14 or for only a fraction of this period. If the signal continues for only a fraction of the period, $T_1$, the frequency of the output of mixer 12 will lie within the band defined by dashed lines 42 for the interval in which signals are applied and then will become equal to the frequency of sweep frequency oscillator 14 represented by line 40 for the remainder of the period.

Delay device 18 is assumed to have a delay time equal to one-fifth of the sweep period of oscillator 14. The signal applied to the input of delay device 18 from filter 16 will pass through the delay device 18 and then be fed back to the input through wide-band amplifier 20. This delayed signal will again be passed through delay device 18 and will continue around the loop formed by delay device 18 and amplifier 20 until interrupted by some external means or until it is reduced to substantially zero amplitude by attenuation in the loop. The gain of amplifier 20 is preferably adjusted so that the signal traveling around this loop undergoes a preselected attenuation. After a number of passages through the delay device 18 in excess of the number required to give the desired delay, the recirculating signal will be attenuated below a detectable level and hence will not interfere with later applied signals.

It can be seen that if the duration of the signal to be delayed is greater than the delay of delay device 18, then, before the signal to be delayed is completely introduced into the loop formed by delay device 18 and amplifier 20, a portion of the signal to be delayed will be applied back to the input of delay device 18. Referring to Fig. 2, the portion of the signal enclosed by bracket 44 will pass through the delay device 18 and appear at the input thereof during the interval that the portion of the signal enclosed by bracket 46 is being applied to the delay device through filter 16. The delayed version of the signal enclosed by bracket 44 is identified by the bracket 44′ in Fig. 2. However, the portion of the signal enclosed by bracket 44′ will not interfere with the portion of the signal enclosed by bracket 46 since these two signals differ in frequency by 600 mc. This 600 mc. difference in frequency results from the fact that sweep frequency oscillator will have undergone one-fifth of the variation in frequency from 1000 mc. to 400 mc. in the time required for the signal enclosed by bracket 44 to make one passage through delay device 18. An examination of Fig. 2 will show that while the output of filter 16 consists of a single signal varying in frequency from 1000 to 4000 mc., at any given instant of time there are five signals circulating in the loop formed by delay device 18 and amplifier 20. Each of these five signals will be separated from adjacent signals by 600 mc. All five signals appear in Fig. 2 only near the end of interval $T_1$ and at the beginning of interval $T_2$ since this figure illustrates the action of the system only for signals originating within the interval $T_1$. The five signals shown in Fig. 2 beginning with the signal enclosed by bracket 44′ represent the signal at the output of delay device 18 and also the signal applied back to the input of delay device 18 since the delay time of wide-band amplifier 20 is negligible.

Filter 24 is designed to pass a band of frequencies including the frequencies present in the signal applied at terminal 10 but no higher frequencies. The frequency of the signal in the output of mixer 22 will be equal to the difference between the frequency of the signal in the output of delay device 18 and the frequency of the signal from oscillator 14. It can be seen from Fig. 2 that the minimum frequency in the output of mixer 22 during the time interval $T_1$ will be equal to approximately 600 mc. A signal at this frequency will be blocked at filter 24 so that no signal will be supplied to output terminal 26. As the sweep of oscillator 14 nears the end of its cycle, the output of mixer 22 will contain signals having frequencies of approximately 600 mc., 1200 mc., 1800 mc. and 2400 mc. These signals result from the combination of the five recirculating signals mentioned above and the signal from oscillator 14. It will be remembered that the signals appearing at the input of mixer 22 at any instant of time were derived from mixer 12 some time interval earlier, this time interval being a multiple of the delay time of delay device 18. In the time required for a particular signal to reach the input of mixer 22, the frequency of oscillator 14 will have shifted 600 mc. for each such multiple of the delay time. All of these signals will be blocked by filter 24.

After oscillator 14 has gone through one complete frequency sweep, it is caused to repeat this frequency sweep either automatically or by means of an external synchronizing signal applied at terminal 50. As a result, the frequency of oscillator 14 at any instant during interval $T_2$ will be exactly equal to the frequency of this oscillator at some earlier time displaced from the instant under consideration by five times the delay of delay device 18. A signal generated by mixer 12 during interval $T_1$ and exactly five delay times earlier than a particular instant in interval $T_2$ will differ in frequency from the frequency of oscillator 14 at that instant only by the frequency of the signals supplied at terminal 10 at the earlier time. Signals derived from mixer 12 four delay times earlier will differ in frequency from the frequency of oscillator 14 by 600 mc. plus or minus the frequency of signals supplied at input 10 at the earlier time. Therefore, during the time interval $T_2$ the frequencies in the output of mixer 22 will lie in the frequency bands zero to 10 mc. and approximately 600 mc., 1200 mc. and 2400 mc. Only the first two frequency bands are shown in Fig. 2. The 600 mc. signal results from the subtraction of frequency 40 and the next higher frequency. The 600 mc. difference is indicated by bracket 52. The 1200 mc. difference in frequency between the frequency of oscillator 14 and the next higher frequency signal is indicated by bracket 54. The 600 mc. and higher frequency signals will be blocked by filter 24 as before. The frequency components from zero to 10 mc. will pass through filter 24 and appear at output terminal 26 as a delayed information-bearing signal. The characteristics of the signal appearing at terminal 26 will be substantially identical to the signal applied at terminal 10 but delayed in time by the time interval $T_1$.

Signals appearing at the input of mixer 22 during interval $T_2$ as a result of video signals supplied to terminal 10 during interval $T_2$ will differ in frequency from the signal supplied by oscillator 14 by at least 600 mc. as before. Therefore there will be no interference during interval $T_2$ between the signals supplied to terminal 10 during intervals $T_1$ and $T_2$. In the interval following interval $T_2$ the signals generated during interval $T_1$ will be sufficiently attenuated by the mixer 22 during interval $T_2$ and the large number of trips through delay device 18 during intervals $T_1$ and $T_2$ so as not to interfere with signals appearing in the output of mixer 22 as a result of video signals supplied to input terminal 10 during interval $T_2$.

The total delay in the system of Fig. 1 will always be equal to an integral multiple of the delay time of delay device 18. In the example given above, the total delay is equal to five times the delay time of delay device 18. In actual practice, it may be desirable to increase the number of passages of the information through the delay line until the total delay time is equal to or in excess of 100 times the delay time of delay device 18. The periods $T_1$ and $T_2$ must be made equal to an exact multiple of the delay time of delay device 18 otherwise the signals in the output of mixer 22 may have frequencies slightly higher or lower than those of corresponding signals at input terminal 10.

In many instances, the recycling of sweep frequency oscillator 14 may be controlled by a free running multivibrator or similar relaxation circuit incorporated in the oscillator circuit. If greater precision is desired or required the multivibrator or equivalent circuit may be synchronized by means of accurately spaced pulses supplied to terminal 50 from some external source. One method of generating a synchronizing pulse is to pass the pulse that initiated the frequency sweep for the interval $T_1$ through a delay line having a total delay time $T_1$. The delayed pulse can then be used to initiate the frequency sweep for the interval $T_2$. Since the only function of this auxiliary delay line is to pass a single synchronizing pulse, irregularities in the passband thereof will be of little consequence. If still greater precision is required, some form of servo loop controlled by a standard frequency introduced at terminal 10 and detected at terminal 26 may be incorporated into the system of Fig. 1.

Another means for overcoming the undesirable frequency shift noted above is illustrated in Fig. 1A. In the modification of the system of Fig. 1 shown in Fig. 1A, a third mixer 28 is inserted between sweep frequency oscillator 14 and mixer 22. A second oscillator 29 having a frequency less than half that of the lowest undesired signal in the output of mixer 22 is coupled to a second input of mixer 28. By way of specific example, oscillator 29 may have a frequency of 100 mc. Low-pass filter 24 of Fig. 1 is replaced by band-pass filter 30 and detector 31 of Fig. 1A. Band-pass filter 30 has a passband centered at the frequency of oscillator 29. The width of the passband is approximately twice the maximum frequency applied at input terminal 10. In the modified circuit shown in Fig. 1A any undesired deviations in the frequency of sweep frequency oscillator 14 from period to period merely shift the frequency of the 100 mc. carrier signal appearing at the output of band-pass filter 30 without shifting the frequency relative to the carrier of the 0–10 mc. sidebands which are superimposed thereon. Therefore, the output of detector 31 will be the desired 0–10 mc. signal unaffected by any deviation in the frequency of oscillator 14 from that of the previous period provided such deviations do not exceed a small fraction of the bandwidth of filter 30.

Various other modifications may be made in the system of Fig. 1 without altering the operation thereof. For example, oscillator 14 may have a nonlinear time versus frequency curve. The limitations on the time versus frequency variation are that the slope should be unidirectional and always greater than zero during the time the signal is applied at terminal 10 and that the variation be repeated on successive sweeps of the oscillator. For example, oscillator 14 may sweep from 1000 to 4000 mc. in one-half the time interval $T_1$ and then remain constant at 4000 mc. for the remainder of the interval $T_1$ provided a signal is applied at terminal 10 only during the first half of interval $T_1$. The frequency of oscillator 14 may vary over limits greater or less than those used in the above illustration without substantially altering the operation of the system.

In the system shown in Fig. 1 the several signals passing through delay device 18 are prevented from interfering with one another by separating them in frequency. In the embodiment shown in Fig. 3, the signals are separated in time. Again, it will be advantageous to describe the embodiment of Fig. 3 in terms of a specific example. In Fig. 3, the signal to be delayed is applied to coder 82 via input terminal 80. Coder 82 may be a binary type coder which converts changes in amplitude of the signal at input 80 to a binary type code in which the figures 1 and zero are indicated by the presence or absence respectively of pulses in a multi-pulse code. By way of specific example, coder 82 may operate with a code of four equally-spaced pulses of uniform amplitude. In the embodiment of Fig. 3, coder 82 acts only as a switch circuit for passing pulses generated in a pulse generator 83. Pulse generator 83 produces a continuous series of equi-spaced pulses. Coder 82 merely permits the passage of up to four pulses, the number of pulses passed and the time location of these pulses depending upon the amplitude of the signal applied at input terminal 80. A binary coder of this type is described in detail in articles beginning at pages 1 and 44 respectively of the Bell System Technical Journal, vol. 27, 1948, American Telephone and Telegraph Company, N. Y. A second type of coder circuit that may be incorporated in the present invention is described in United States Patent No. 2,569,927, issued October 2, 1951, for Binary Coding by Successive Subtractions. This second type of decoder circuit requires that the input signal be sampled and quantized during intervals corresponding to the time of occurrence of pulses from pulse generator 83. Circuits for performing the sampling operation are well known in the time multiplex art.

The output of coder 82 is coupled directly to delay line 84. The output of delay line 84 is coupled through a gate circuit 86 to an input of triggered multivibrator 88. Gate circuit 86 may be a conventional voltage amplifier stage that is biased so that it is normally operative to pass these signals. The operation of gate circuit 86 is controlled by a signal from pulse generator 83 applied through inverter 87. Multivibrator 88 produces an output pulse of fixed amplitude and time duration in response to each pulse applied at the input thereof. The output of multivibrator 88 is coupled back to the input of delay line 84. In the recirculating loop consisting of delay line 84, gate circuit 86 and multivibrator 88, multivibrator 88 may be considered to be a pulse amplifier with automatic gain control since it produces output pulses of equal time duration and in time coincidence with the pulses applied at the input thereof. Other circuits having similar characteristics are known in the art. These circuits may be substituted for multivibrator 88 without departing from the intended scope of the invention.

The output of delay line 84 is also coupled to a gate circuit 90. Gate circuit 90 normally blocks the passage of signals from delay line 84 to a decoder 92 coupled to the output of gate circuit 90. Gate circuit 90 may be a conventional voltage amplifier stage normally biased to an inoperative state but which may be made operative to amplify a signal by the application thereto of a positive control signal. A signal from pulse generator 83 causes gate circuit 90 to become operative to pass signals from delay line 84 to decoder 92. Decoder 92 may be a binary type decoder which will convert the original code produced by coder 82 to a signal of variable amplitude corresponding to the variable amplitude signal at input 80. A description of a binary type decoder is to be found on pages 36 to 38 of the above-mentioned volume 27 of the Bell System Technical Journal. This variable amplitude signal appears at terminal 100 which is the output terminal of the system.

The operation of the system of Fig. 3 will be explained in terms of a specific embodiment in which the signal from the output of coder 82 is passed three times through delay line 84, thus making the total delay of the system equal to three times the delay time of delay line 84. It will be assumed that the operation of the system is initiated at time $t_1$ of Fig. 4 so that at time $t_1$ there is no information stored in the system. The four pulses of a code group are identified in Fig. 4 by lower case letters $a$, $b$, $c$ and $d$. The subscripts 1, 2, 3, etc. added to these letters identify the successive code groups generated after time $t_1$. The superscripts 1, 2 and 3 added to these letters indicate the number of times that a particular pulse has been delayed by delay line 84. Thus a pulse identified as $b_1^2$ is the second pulse in the first group generated after time $t_1$ after passing through delay line 84 twice. The waveforms in Fig. 4 which illustrate the time relationships of the signals at various points in the system of Fig. 3 are identified by the upper case letters A through J. For the convenience of the reader, reference letters A through J have been added to the block diagram of Fig. 3 to indicate the points at which the waveforms of Fig. 4 appear.

The signal to be delayed is shown in waveform A of Fig. 4. The sampling frequency corresponding to the sampling period $T_s$ in Fig. 4 is chosen to be at least twice the highest frequency present in the signal of waveform A in order that the decoder 92 may reproduce the original wave with a minimum of distortion. The amplitudes of the signal at times $t_1$, $t_2$, $t_3$, etc. determine the composition of the four pulse codes that are generated in the intervals immediately following each of these times. The entire four pulse code for each sampling period $T_s$ is shown in waveform B but pulses $b_1$ and $c_2$ have been shaded to indicate pulses that might be absent in the actual operation of the system. Explained in another way, coder 82 may generate a code group consisting of pulses $a$, $c$ and $d$ to represent the amplitude of the signal at input terminal 80 at time $t_1$ and a code group consisting of pulses $a$, $b$ and $d$ to represent the amplitude of the signal at time $t_2$.

In the example shown in Fig. 4, the total delay time $T_D$ is equal to three times the delay time $T_L$ of delay line 84. In order that signals applied at the input of delay line 84 may be circulated therethrough three times without interference, it is necessary that the interpulse period $T_{ip}$ be equal to at least three times the pulse duration $T_p$. The general relationship between $T_D$, $T_L$, $T_{ip}$ and $T_p$ may be expressed as follows:

$$\frac{T_D}{T_L} = n \leq \frac{T_{ip}}{T_p}$$

where $n$ is an integer and the symbol $\leq$ denotes "equal to or less than."

It has been pointed out above that $T_s$ is limited by the fact that the sampling frequency should be at least twice the highest frequency present in the signal to be delayed. The interval $T_s$ is also equal to an integral multiple of the interpulse period $T_{ip}$. For reasons that will become apparent as the description of the invention proceeds the total delay time $T_D$ is equal to an integral multiple of the interpulse period $T_{ip}$ but not an integral multiple of the sampling period $T_s$. One preferred relationship between $T_L$, $T_D$, $T_{ip}$ and $T_s$ may be expressed in general terms as follows:

$$T_L = (m + 1/n) T_{ip}$$
$$T_D = n T_L = (mn + 1) T_{ip}$$
$$T_s = m/k T_{ip}$$

where $m$ and $k$ are both integers and $n$ is as defined above. In the specific example of Fig. 4, $m=10$, $n=3$ and $k=2$.

Returning now to the specific example shown in Fig. 4, the signals illustrated in waveform B of Fig. 4 are applied to the input of delay line 84 where they are delayed for a time equal to $nT_L$ by $n$ passages through delay line 84. In the example under consideration $n=3$. Waveforms C, D and E illustrate the time position of the pulses of waveform B after one, two and three passages, respectively through delay line 84. The signal appearing at the output of delay line 84 is shown in waveform F which is a superposition of waveform C, D and E. The output of pulse generator 83 is shown in waveform G. It will be noted that these pulses occur in time coincidence with the pulses of waveform B. Each pulse in the signal represented by waveform G renders gate circuit 86 inoperative to pass signals from delay line 84 to multivibrator 88 for the duration of the pulse. The output of inverter 87 is not shown since it would correspond exactly to wave form G except for the sign of the pulses. In the example shown, the blocking of gate circuit 86 will not affect the operation of the system of Fig. 4 until time $t_4$ of Fig. 4 inasmuch as no pulses appear in the output of delay line 84 in time coincidence with the pulses shown in waveform G during the interval $t_1$ to $t_4$. However, following time $t_4$ pulses $a_1^3$, $b_1^3$, $c_1^3$, $d_1^3$, $a_2^3$, $b_2^3$, $c_2^3$ and $d_2^3$ will occur in time coincidence with the pulses in waveform G and hence will be blocked by gate 86. Waveform H indicates the signals that are passed by gate circuit 86. At the times that gate circuit 86 is rendered inoperative, gate circuit 90 is rendered operative to pass a signal by the signals from pulse generator 83. Therefore, the signals that are blocked by gate circuit 86 are passed through gate circuit 90 to decoder 92. The signals passed by gate circuit 90 are shown in waveform I. It should be observed that waveform I corresponds to waveform B delayed by an interval $T_D$. Decoder 92 will reproduce the signal of waveform A in response to the pulse codes of waveform I.

Waveform J represents the total signal appearing at the input of delay device 84. This waveform which is formed by the superposition of waveforms B and H, is of interest in that it illustrates the manner in which pulse $b_7$ replaces pulse $a_1^3$ in the recirculating loop, pulse $a_1^3$ being blocked by gate circuit 86. Similarly, pulse $c_7$ replaces pulses $b_1^3$ and $d_7$ replaces pulse $c_1^3$. Pulse $d_1^3$ is not replaced in the recirculating loop since no pulse occurs in waveform B at the time that pulse $d_1^3$ is blocked by gate circuit 86.

If the waveforms of Fig. 4 are extended, it will be seen that a continuous signal may be applied to input terminal 80 and a corresponding continuous delayed signal obtained at output terminal 100 of Fig. 3. The output of the system of Fig. 3 is zero during the interval $t_1$ to $t_4$ only by virtue of the fact that it was assumed that the output of coder 82 was zero until time $t_1$.

Fig. 3 illustrates only one preferred form of time sharing system arranged in accordance with the teachings of the present invention. Many modifications may be made in the system of Fig. 3 without departing from the spirit and scope of the invention. For example, binary coder 82 may be replaced by an amplitude modulator in which the signal at input 80 controls the amplitude of the pulses in the output of coder 84 rather than controlling only the presence or absence of one or more pulses in a pulse code. In this modification, the pulses in the output of the modulator will correspond to time samples of the input wave at terminals 80. To complete this modification, multivibrator 88 must be replaced by a pulse amplifier having a stable, fixed gain, and decoder 92 must be exchanged for a long time constant detector circuit. Long time constant detector circuits of the type required are generally known in the art as "pulse stretchers." It is essential that the relationship between the delay time of delay line 84 and the frequency of pulse generator 83 remain fixed if the system of Fig. 3 is to operate in a satisfactory manner. One means for maintaining this relationship comprises a second control multivibrator (not shown) connected between the output and input of the delay line 84. This control multivibrator is biased to respond only to pulses having amplitudes greater than the amplitude of pulses produced by multivibrator 88. The control multivibrator generates a relatively high amplitude control pulse in response to a signal of the proper amplitude in the output of delay line. Therefore, the period between successive control pulses is equal to the delay time of the delay line. Suitable frequency count down circuits convert the series of control pulses and the signal from pulse generator 83 to a common submultiple frequency. A detector responsive to any difference in the submultiple frequencies furnishes a frequency control signal to pulse generator 83.

Since the embodiments described above constitute only certain preferred embodiments of the present invention, the scope of the invention may be determined with great particularity only by reference to the hereinafter appended claims.

I claim:

1. A system for delaying an information-bearing signal comprising, means for converting said information-bearing signal to a series of equi-spaced pulses, the amplitudes of the several pulses being determined by the amplitude of said information-bearing signal, a delay device having a delay time differing from an integral multiple the time spacing of said pulses by at least the time width of one of said pulses, the input of said delay device being connected to the output of said first-mentioned means, means coupling the output of said delay device to the input thereof, thereby to cause said series of pulses to be passed repeatedly through said delay device, means for extracting said series of pulses from said delay device after a predetermined number of passages therethrough, and means responsive to said extracted series of pulses for generating a signal having characteristics similar to said information-bearing signal.

2. A system for delaying an information-bearing signal comprising, means for converting said information-bearing signal to a multi-pulse code of equi-spaced pulses, the amplitude of said information-bearing signal being indicated by the presence or absence of the several pulses in said pulse code, a delay device having a delay time differing from the time spacing of said pulses by at least the time duration of one of said pulses, the input of said delay device being coupled to the output of said first-mentioned means, means coupling the output of said delay device to the input thereof, thereby to cause said pulses of said code to be passed repeatedly through said delay device, means for extracting said pulses of said code from said delay device after a predetermined number of passages therethrough, and means responsive to said extracted series of pulses for generating a signal having characteristics similar to said information-bearing signal.

3. A system for delaying an information-bearing signal comprising, means for converting said information-bearing signal to a series of equi-spaced pulses, the amplitudes of the several pulses being determined by the amplitude of said information-bearing signal, a delay device having a delay time differing from an integral multiple of the time spacing of said pulses by at least the time duration of one of said pulses, the input of said delay device being coupled to the output of said first-mentioned means, means coupling the output of said delay device to the input thereof, thereby to cause said series of pulses to be passed repeatedly through said relay device, a normally blocked gate circuit coupled to the output of said delay device, means for rendering said gate circuit operative to pass signals at time intervals corresponding to the times of occurrence of said pulses in said pulse series after a predetermined number of passages of said series through said delay device, and means responsive to signals passed by said gate circuit for generating a signal having characteristics similar to said information-bearing signal.

4. A system for delaying an information-bearing signal comprising, a source of equi-spaced pulse signals, a coder circuit responsive jointly to pulse signals from said source and said signal to be delayed, said coder circuit being operative to produce a multi-pulse code, the characteristics of said information-bearing signal being indicated by the presence or absence of the several pulses in said code, a delay device having a delay time differing from an integral multiple of the time spacing of said pulses by at least the time duration of one of said pulses, the input of said delay device being coupled to the output of said coder, means including a first gate circuit and a pulse amplifying means coupling the output of said delay device to the input thereof, said gate circuit being normally operative to pass signals, a decoding circuit, a second gate circuit coupling said delay device to said decoding circuit, said second gate circuit normally blocking the passage of signals therethrough, and means coupled to said first and second gate circuits for controlling the operation thereof, said last-mentioned means causing said second gate circuit to be rendered operative to pass signals and said first gate circuit to be inoperative to pass signals at intervals following the occurrence of each of the said pulses in the output of said coder circuit equal to an integral multiple of the delay time of said delay device.

5. A system for delaying an information-bearing signal comprising, means for sampling said signal to be delayed at intervals spaced apart by time intervals $T_s$, means for converting said sampled signal into a multi-pulse code having pulse durations $T_p$ and interpulse periods $T_{ip}$, where $T_{ip}$ is equal to $nT_p$, $n$ being an integer, the characteristics of said information-bearing signal being indicated by the presence or absence of the several pulses in said code, a delay device having a delay time $T_L$ where $T_L = (m+1/n)T_{ip}$, $m$ being an integer, the input of said delay device being coupled to the output of said last-mentioned means, means including a first gate circuit and a pulse amplifying means coupling the output of said delay device to the input thereof, said gate circuit being normally operative to pass signals, a decoding circuit, a second gate circuit coupling said delay device to said decoding circuit, said second gate circuit normally blocking the passage of signals therethrough, and means coupled to said first and second gate circuits for controlling the operation thereof, said last-mentioned means causing said second gate circuit to be rendered operative to pass signals and said first gate circuit to be inoperative to pass signals at intervals following the occurrence of each of the said pulses in the multi-pulse code equal to $nT_L$.

6. A system for delaying an information-bearing signal comprising, means for generating a series of equi-spaced pulses, means coupled to said pulse generating means and said source of information-bearing signal for causing each of the several pulses to have one of at least two amplitude values determined by a selected characteristic of said information-bearing signal at preselected spaced time intervals, a delay device having a delay time differing from an integral multiple of the time spacing of said pulses by at least the time width of one of said pulses, means for supplying said pulses having amplitude values determined by said selected characteristic to the input of said delay device, means coupling the output of said delay device to the input thereof, thereby to cause said series of pulses to be passed repeatedly through said delay device, means for extracting said series of pulses from said delay device after a predetermined number of passages therethrough, and means responsive to said extracted series of pulses for generating a signal having characteristics similar to said information-bearing signal.

7. A system for delaying an information-bearing signal comprising, means for generating a series of equi-spaced pulses, means coupled to said pulse generating means and said source of information-bearing signal for causing each of the several pulses to be amplitude modulated so as to have one of at least two amplitude values determined by the amplitude of said information-bearing signal at preselected spaced time intervals, a delay device having a delay time differing from an integral multiple of the time spacing of said pulses by at least the time duration of one of said pulses, means for supplying said amplitude modulated pulses to the input of said delay device, means coupling the output of said delay device to the input thereof, thereby to cause said series of pulses to be passed repeatedly through said delay device, a normally blocked gate circuit coupled to the output of said delay device, means for rendering said gate circuit operative to pass signals at time intervals corresponding to the times of occurrence of said pulses in said pulse series after a predetermined number of passages of said series through said delay device, and means responsive to signals passed by said gate circuit for generating a signal having characteristics similar to said information-bearing signal.

8. A system for delaying an information-bearing signal comprising, means for generating a series of equi-spaced pulses, means coupled to said pulse generating means and said source of information-bearing signals for causing each of the several pulses to be amplitude modulated so as to have one of at least two amplitude values determined by the amplitude of said information-bearing signal at preselected spaced time intervals, a delay device having a delay time differing from an integral multiple of the time spacing of said pulses by at least the time duration of one of said pulses, means for supplying said amplitude modulated pulses to the input of said delay device, means coupling the output of said delay device to the input thereof, thereby to cause said series of pulses to be passed repeatedly through said delay device, a normally blocked gate circuit coupled to the output of said delay device and to said pulse generating means, said gate circuit being arranged to be rendered operative by said generated pulses to pass signals occurring in the output of said delay device in time coincidence therewith, and means responsive to signals passed by said gate circuit for generating a signal having characteristics similar to said information-bearing signal.

9. A system for delaying an information-bearing signal comprising, means for generating a series of pulses having pulse duration $T_p$ and interpulse periods $T_{ip}$, where $T_{ip}$ is equal to $nT_p$, $n$ being an integer, means coupled to said pulse generating means and said source of information-bearing signals for causing each of the several pulses to be amplitude modulated so as to have one of at least two amplitude values determined by the amplitude of said information-bearing signals at intervals $T_s$ where $T_s$ is equal to $m/k\ T_{ip}$, $m$ being an integer and $k$ being an integer less than $m$, a delay device having a delay time $T_L$ coupled to said pulse modulating means, where $T_L$ is equal to $(m+1/n)\ T_{ip}$, means for supplying said amplitude modulated pulses to the input of said delay device, means coupling the output of said delay device to the input thereof, thereby to cause said series of amplitude modulated pulses to be passed repeatedly through said delay device, a normally blocked gate circuit coupled to the output of said delay device and to said pulse generating means, said gate circuit being arranged to be rendered operative by said generated pulses to pass signals occurring in the output of said gate circuit in time coincidence therewith, and means responsive to signals passed by said gate circuit for generating a signal having characteristics similar to said information-bearing signal.

10. A system for delaying an information bearing signal composed of a series of pulses having duration $T_p$ and interpulse periods $T_{ip}$ where $T_{ip}$ is equal to $nT_p$, $n$ being an integer, a delay device having a delay time $T_L$, where $T_L$ is equal to $(m+1/n)T_{ip}$, $m$ being an integer, said delay device including an input circuit to which the signals to be delayed may be supplied, means coupling the output of said delay device to the input thereof, thereby to cause pulses supplied to the input of said delay device to be passed repeatedly through said delay device, said last-mentioned means including a first gate circuit, said gate circuit being normally operative to pass signals, a second, normally blocked gate circuit coupled to the output of said delay device, means associated with said first and second gate circuits for periodically unblocking said second gate circuit and simultaneously rendering said first gate circuit inoperative to pass signals for periods $T_p$ at intervals $T_{ip}$, whereby pulses supplied to said input circuit of said delay device in time coincidence with the unblocking of said second gate circuit will be passed by said second gate circuit and excluded from said delay device after a plurality of passages through said delay device.

11. The system for delaying an information bearing signal of claim 8 wherein said means coupling the output of said delay device to the input thereof includes a second gate circuit, said second gate circuit being normally operative to pass signals, and means associated with said second gate circuit for rendering said second gate circuit inoperative to pass signals at the times said gate circuit coupled to the output of said delay device is rendered operative to pass signals.

12. The system for delaying an information bearing signal of claim 9 wherein said means coupling the output of said delay device to the input thereof includes a second gate circuit coupled to said pulse generating means, said second gate circuit being normally operative to pass signals, said second gate circuit being arranged to be rendered inoperative to pass signals by said generated pulses.

13. A system for delaying a signal comprising a delay device having a delay time differing from an integral multiple of a first selected time interval by $n$ times a second selected time interval, where $n$ is an integer, means for supplying the signal to be delayed to the input of said delay device, two separate means coupled to the output of said delay device, the first of said two means being means coupling the output of said delay device to the input thereof, thereby to cause the signal to be delayed to be passed repeatedly through said delay device, the second of said two means being a normally blocked gate circuit coupled to the output of said delay device, and means coupled to said gate circuit for causing said gate circuit to be rendered operative to pass signals at spaced time intervals, the durations of said time intervals being equal to said second selected time intervals and the time spacing between said time intervals being equal to said first selected time intervals, whereby pulses supplied to said input circuit of said delay device in time coincidence with the unblocking of said gate circuit will be passed by said gate circuit after a plurality of passages through said delay device.

14. A system for delaying an information bearing signal comprising a delay device having a delay time $T_L$, where $T_L$ is equal to $(m+1/n)\ T_{ip}$, $m$ and $n$ being integers and $T_{ip}$ being a preselected time interval, said delay device including an input circuit to which the signal to be delayed may be supplied, two separate means coupled to the output of said delay device, the first of said two means being means coupling the output of said delay device to the input thereof, thereby to cause signals supplied to the input of said delay device to be passed repeatedly through said delay device, and the second of said two means being a normally blocked gate circuit coupled to the output of said delay device, means for periodically unblocking said gate circuit for periods $T_p$ at intervals $T_{ip}$ where $T_p$ is equal to $T_{ip}/n$, whereby a series of pulses having a duration $T_p$ and an interpulse period $T_{ip}$, supplied to the input of said delay device with the pulses in time coincidence with the unblocking of said gate circuit, will be passed by said gate circuit after a plurality of passages through said delay device.

References Cited in the file of this patent

UNITED STATES PATENTS

| 2,228,815 | Deerhake | Jan. 14, 1941 |
| 2,406,316 | Blumlein et al. | Aug. 27, 1946 |
| 2,482,974 | Gordon | Sept. 27, 1949 |
| 2,510,167 | Boothroyd | June 6, 1950 |
| 2,545,567 | Bridges | Mar. 20, 1951 |
| 2,629,820 | Snyder | Feb. 24, 1953 |

OTHER REFERENCES

Article: "Design of Mercury Delay Lines," pp. 134 to 138 of Electronics, November 1947, by Sharpless.

Article: "Mercury Delay Line Memory Using a Pulse Rate of Several Megacycles," by Auerbach et al., pp. 855 to 861, of Proc. of I. R. E., August 1949.

UNITED STATES PATENT OFFICE

CERTIFICATE OF CORRECTION

Patent No. 2,800,580                                        July 23, 1957

Richard S. Davies

It is hereby certified that error appears in the printed specification of the above numbered patent requiring correction and that the said Letters Patent should read as corrected below.

Column 3, line 56, for "400 mc." read --4000 mc.--; column 9, line 47, for "relay" read --delay--; column 10, line 12, for "$T_{jp}$" read --$T_{ip}$--.

Signed and sealed this 10th day of December 1957.

(SEAL)
Attest:
KARL H. AXLINE

Attesting Officer

ROBERT C. WATSON
Commissioner of Patents